Sept. 11, 1928.
J. H. ETHEREDGE
1,683,768
COTTON CHOPPER
Filed Sept. 29, 1927
2 Sheets-Sheet 1
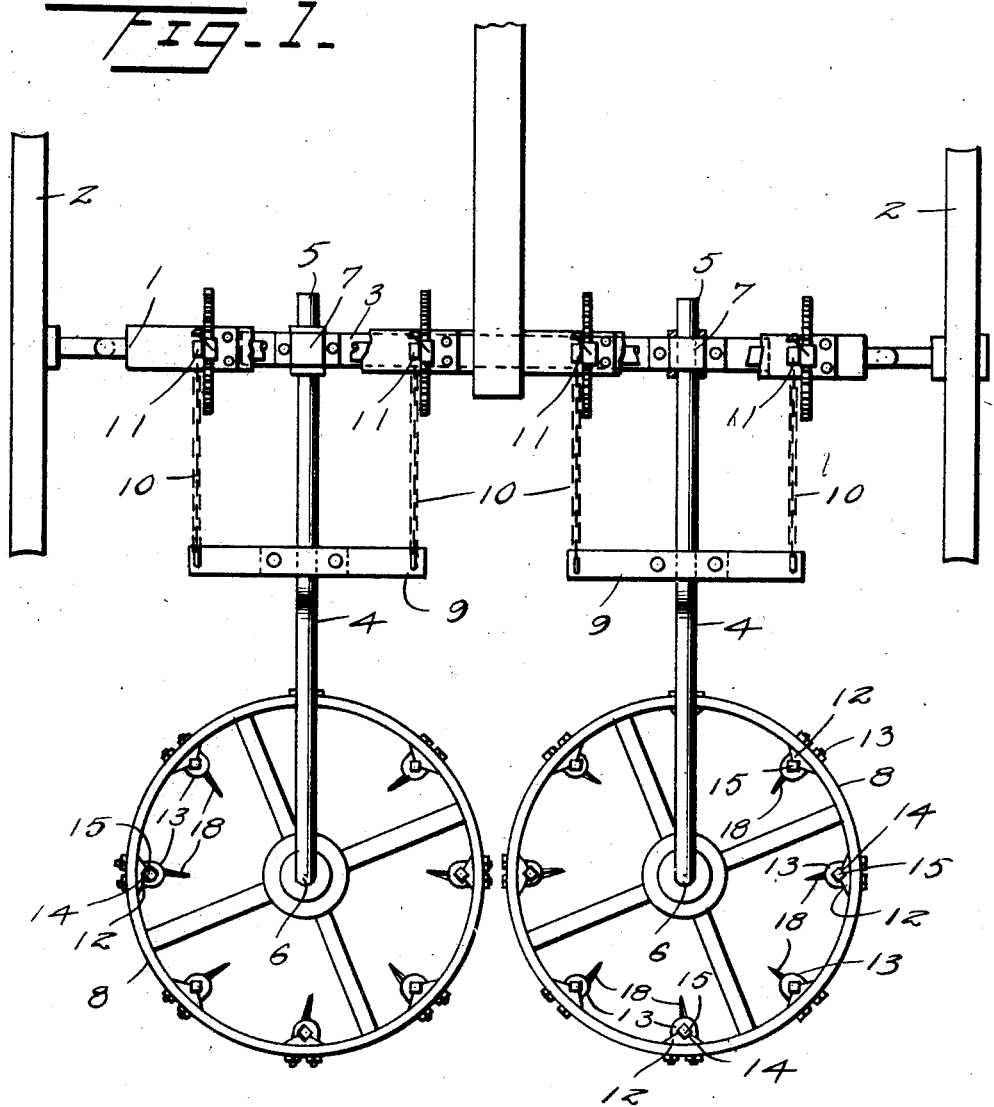
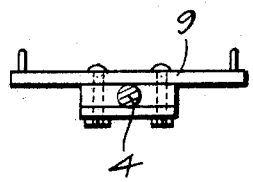
Inventor
J. H. Etheredge
By Watson E. Coleman
Attorney Sept. 11, 1928.

J. H. ETHEREDGE 1,683,768

COTTON CHOPPER

Filed Sept. 29, 1927

Inventor
J. H. Etheredge
By Watson E. Coleman
Attorney

Patented Sept. 11, 1928.

1,683,768

UNITED STATES PATENT OFFICE.

JOHN H. ETHEREDGE, OF TAFT, TEXAS, ASSIGNOR OF ONE-HALF TO LELAND A. CAGE, OF TAFT, TEXAS.

COTTON CHOPPER.

Application filed September 29, 1927. Serial No. 222,877.

This invention relates to a two row cotton chopper and cultivator attachment for a wheel mounted cultivator frame and it consists in the novel features hereinafter described and claimed.

An object of the invention is to provide an attachment of the character indicated which consists of a pair of wheels journaled upon downwardly disposed end portions of beams, said beams being adapted to be pivotally connected at their other ends with the wheeled frame of the cultivator in order that the first mentioned wheels may swing or oscillate substantially horizontally. Means are provided for tilting the beams so that the first mentioned wheels may be disposed in desired planes and at proper angles with relation to the general surface line of the soil.

A still further object of the invention is to provide in conjunction with wheels mounted as hereinbefore indicated, chopping and cultivating teeth which are so mounted upon the wheels as to cause the wheels to rotate as the cultivator frame moves over the surface of the soil. This is brought about by the shape and disposition of the teeth with relation to the centers of the wheels and the surface of the soil. By reason of this arrangement the teeth may be caused to work at different distances below the surface of the soil and consequently the said wheels may be caused to rotate fast or slow as desired.

In the accompanying drawings:—

Figure 1 is a top plan view of the cotton chopper with parts thereof broken away;

Figure 6 is a transverse sectional view through the beam of the attachment.

Figure 2:
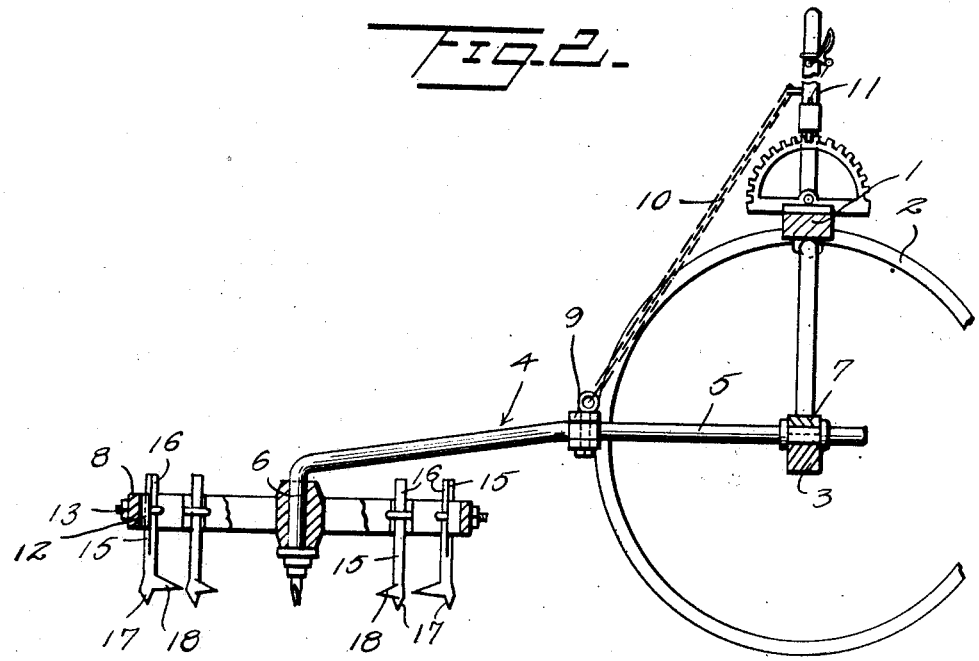
Figure 2 is a fragmentary side elevation thereof with parts broken away and parts shown in section.
Figure 3:
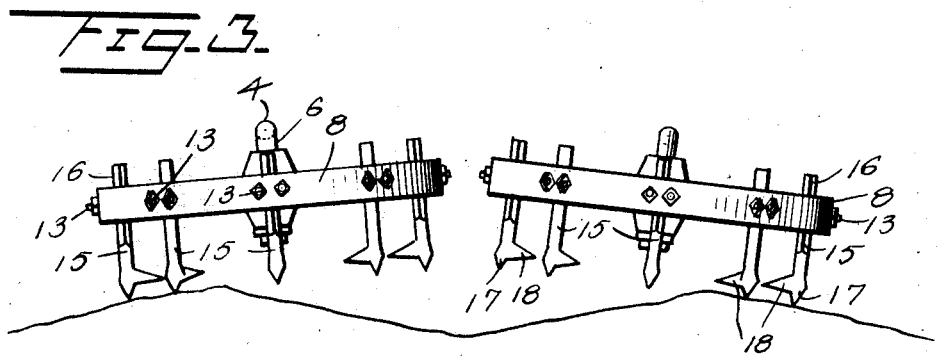
Figure 3 is an end elevational view of the attachment.
Figures 4, 5:
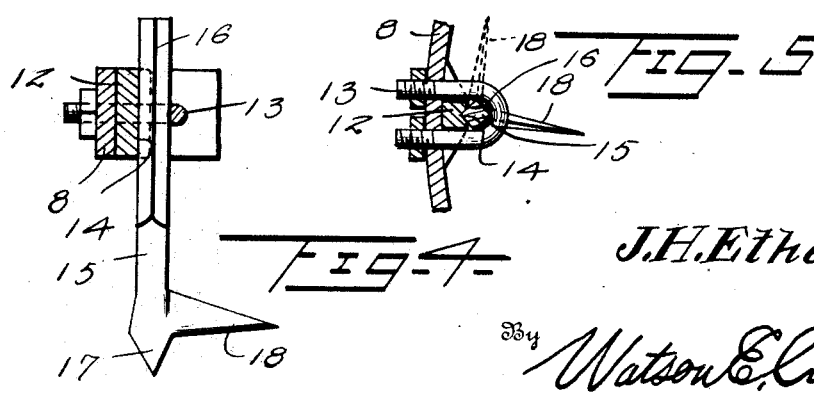
Figure 4 is a side elevational view of a tooth used in the attachment and securing parts shown in section.
Figure 5 is a transverse sectional view of the tooth and securing parts.

The cultivator frame to which the cotton chopper attachment is applied consists of the usual arch axle 1 having ground wheels 2 journaled at the ends thereof and a bar 3 carried below the intermediate portion of the said axle and connected therewith in any suitable manner. The said bar serves as spacing means for beams, hereinafter to be described, and also as supports and attaching means for the same. The beams, referred to, are of the same shape and dimensions and the parts carried thereby are of the same arrangement, consequently a description of one beam and its attachments will answer for all. Each beam 4 is provided with angularly disposed end portions 5 and 6, the end portion 5 being longer than the end portion 6. The end portion 5 is pivotally connected with the bar 3 by means of a bearing 7 so that the beam may swing or rock longitudinally of the said bar and transversely of the line of draft of the cultivator frame. A wheel 8 is loosely journaled upon the shorter end portion 6 of the beam 4. A cross arm 9 is mounted upon the intermediate portion of the beam 4 and its ends are connected by means of chains or flexible connections 10 with the working ends of levers 11, mounted at suitable spaced points upon the frame of the cultivator.

Cleat blocks 12 are mounted upon the peripheral portion of the wheel 8 and are held in position by means of U-shaped clamp bolts 13. Said cleat blocks are provided at their sides and at point between their ends with recesses 14. Said recesses occur opposite the intermediate portions of the clamp bolts 13. Teeth having shanks 15 are held between the cleat blocks and intermediate portions of the clamp bolts. The shanks of the teeth are provided at their upper ends with corner portions 16 which are received in the recesses 14 of the cleat blocks and whereby the shanks of the teeth are held against turning movement upon their axes in the blocks. The teeth are provided at the lower ends of their shanks 15 with pointed extremities 17, the axes of which are offset slightly with relation to the shanks 15. Each shank 15 is provided at its side and adjacent the inner end of its pointed extremity 17 with a laterally disposed fluke portion or blade 18. The said blade is provided with side surfaces which are disposed substantially helically with relation to the axis of the shank of the tooth. The blades 18 are pointed at their outer ends as at 19.

The beams 4 are so connected with the spacing bar 3 that the rear ends thereof are disposed between the lines of adjacent rows of standing plants so that the centers of the wheels 8 are located between the lines of the rows. By using the levers 11 the beams 4 may be turned so that the wheels 8 are disposed at desired angles with relation to the general plane of the surface of the soil. Also the said wheels are held above the ridges upon the soil and the teeth at the outer side portions of the wheels enter the surface of the soil at the outer sides of the ridges. As the cultivator moves in its line of draft the pointed extremities 17 and the blades 18 enter the soil and cause the wheels to rotate upon the end portions 6 of the beams. This is due to the fact that the resistance of the soil presents sufficient drag upon the flukes or blades 18 to cause the said wheels to rotate and also to cause the teeth to move transversely across the rows of plants. As the teeth move across the lines of the rows they will cut out the superfluous standing plants and those plants which occur at the spaces between the adjacent teeth are left standing in the rows of ridges upon the soil. By varying the angle of inclination of the wheels with relation to the general plane of the soil the teeth may be caused to operate at various distances below the surface of the soil and consequently the wheels may be caused to turn fast or slow according to the depth at which the teeth operate in the soil. The sides of the wheels which are located between the rows of standing plants may be lowered if desired and consequently the wheels may be caused to rotate in directions opposite to those hereinbefore indicated. The spaces between the teeth may be increased or diminished as desired to regulate the distances between the plants which are left standing in the rows.

Having described the invention what is claimed is:—

1. A cotton chopper attachment comprising a beam having angularly disposed end portions, one end portion adapted to be pivotally connected with a frame for tilting movement transversely of the line of draft thereof, a wheel journaled upon the other end portion of the beam, teeth carried by the wheel and means for tilting the beam and wheel transversely of the line of draft.

2. A cotton chopper attachment comprising a spacing bar adapted to be connected with a movable frame, beams pivoted upon the bar for rocking movement longitudinally thereof, said beams being spaced from each other, wheels journaled upon the beams and disposed in substantially horizontal planes below the spacing bar, teeth carried by the wheels and means mounted upon the frame for rocking beams.

3. A cotton chopper attachment comprising a beam having angularly disposed end portions, one end portion adapted to be pivotally connected with a frame for rocking movement transversely of the line of draft thereof, a wheel journaled upon the other end portion of the beam, teeth carried by the wheel and means mounted upon the frame and connected with the beam for tilting the plane of the wheel.

4. A cotton chopper attachment comprising a beam having angularly disposed end portions, one end portion adapted to be pivotally connected with a frame for rocking movement transversely of the line of draft thereof, a wheel journaled upon the other end portion of the beam, teeth carried by the wheel and having laterally disposed blade portions and means mounted upon the frame for tilting the plane of the wheel.

In testimony whereof I hereunto affix my signature.

JOHN H. ETHEREDGE.